(12) United States Patent
Smith et al.

(10) Patent No.: US 9,604,164 B2
(45) Date of Patent: Mar. 28, 2017

(54) FLUID INTAKE SCREEN (71) Applicant: BILFINGER WATER TECHNOLOGIES, INC., New Brighton, MN (US)

(72) Inventors: Albert Smith, Brooklyn Park, MN (US); Thomas James Berger, Saint Louis Park, MN (US)

(73) Assignee: Aqseptence Group, Inc., New Brighton, MN (US)

( * ) Notice: Subject to any disclaimer, the term of this patent is extended or adjusted under 35 U.S.C. 154(b) by 421 days.

(21) Appl. No.: 14/331,915

(22) Filed: Jul. 15, 2014

(65) Prior Publication Data
US 2015/0014242 A1 Jan. 15, 2015

Related U.S. Application Data (60) Provisional application No. 61/846,399, filed on Jul. 15, 2013.

(51) Int. Cl.
*B01D 39/10* (2006.01)
*B01D 29/07* (2006.01)
(Continued)

(52) U.S. Cl.
CPC .............. *B01D 35/28* (2013.01); *B01D 29/33* (2013.01); *B01D 29/48* (2013.01); *B23K 31/02* (2013.01)

(58) Field of Classification Search
CPC .... B01D 29/012; B01D 29/445; B01D 29/03; B01D 29/035; B01D 35/28; B01D 39/10; B01D 39/12; B23K 31/02
(Continued)

(56) References Cited

U.S. PATENT DOCUMENTS 5,968,357 A * 10/1999 Doelle ................. B01D 29/111
209/404
6,510,947 B1 * 1/2003 Schulte ................ B01D 29/012
175/66
(Continued)

OTHER PUBLICATIONS

Johnson Screens, Inc., "Water Well Looking Beyond Tomorrow," 2008, downloaded from <http://www.johnsonscreens.com/sites/default/files/literature/Water%20Well%20Screen%20and %20Accessories.pdf> on Jul. 15, 2014, pp. 1-16.
(Continued)

*Primary Examiner* — Ana Fortuna
(74) *Attorney, Agent, or Firm* — Patterson Thuente Pedersen, P.A.

(57) ABSTRACT

A screen for intake of fluid. The screen includes parallel and spaced rods, filtration material, a fitting, and structural members. The rods may be distributed in a cylindrical configuration. The filtration material, in some embodiments spirally wrapped wire, is disposed around the rods to define an interior volume. The fitting is disposed at an end of the rods and adjacent to the filtration material. Each structural member, which in some embodiments are elongated bars, is interposed between adjacent rods. The structural members are welded to the adjacent rods, and the adjacent rods and the structural members are welded to the fitting to increase the effective weld area, the tensile strength of the connection, and potentially the overall strength of the screen. The screen may be used for a variety of fluids and installations, and is particularly suited to use in water wells.

18 Claims, 7 Drawing Sheets

(51) Int. Cl.
  *B01D 35/28* (2006.01)
  *B23K 31/02* (2006.01)
  *B01D 29/33* (2006.01)
  *B01D 29/48* (2006.01)

(58) Field of Classification Search
  USPC .................................. 210/499, 488; 228/178
  See application file for complete search history.

(56) References Cited

U.S. PATENT DOCUMENTS

| | | | | |
|---|---|---|---|---|
| 6,565,698 B1* | 5/2003 | Adams | ................ | B01D 29/012 |
| | | | | 156/290 |
| 7,210,584 B2* | 5/2007 | Wnuk | ................ | B01D 29/15 |
| | | | | 210/232 |
| 7,223,340 B2* | 5/2007 | Zha | ................ | B01D 63/02 |
| | | | | 210/232 |
| 7,243,715 B2* | 7/2007 | Wang | ................ | E21B 43/084 |
| | | | | 166/230 |
| 8,083,941 B2* | 12/2011 | Chien | ................ | B01D 29/111 |
| | | | | 210/314 |
| 2006/0266695 A1* | 11/2006 | Takahashi | ................ | B01D 29/48 |
| | | | | 210/483 |
| 2009/0211965 A1* | 8/2009 | Parr | ................ | B01D 29/445 |
| | | | | 210/488 |
| 2012/0181237 A1* | 7/2012 | Winkler | ................ | B01D 33/067 |
| | | | | 210/773 |
| 2016/0010353 A1* | 1/2016 | Giroux | ................ | E04H 4/1272 |
| | | | | 4/494 |
| 2016/0024895 A1* | 1/2016 | Russell | ................ | E21B 43/084 |
| | | | | 166/230 |
| 2016/0100596 A1* | 4/2016 | Massey | ................ | A23B 4/22 |
| | | | | 426/335 |

OTHER PUBLICATIONS

Johnson Screens, Inc., "Stainless Steel Well Screens and Accessories," 2011-2012, downloaded from <http://www.johnsonscreens.com/sites/default/files/8/715/Stainless%20Steel%20Well%20Screens%20and%20Accessories%20-%20North%20America.pdf> on Jul. 15, 2014, pp. 1-20.

* cited by examiner

FLUID INTAKE SCREEN

CROSS-REFERENCE TO RELATED APPLICATION

This application claims the benefit of U.S. Provisional Application 61/846,399, filed Jul. 15, 2013, and titled "Fluid Intake Screen," the contents of which are incorporated herein by reference in its entirety.

BACKGROUND

Screens are used in water wells to retain sand and gravel in the well hole, and prevent debris from being pumped from the well. The screen aids in the proper development of the well structure. In some cases, these wells can be deep underground. When the screens are installed, there is often a great deal of weight hanging from the screen as it is lowered into the well bore. This can cause the screen to fracture or separate, releasing other screen or piping that is attached to the screen into the well. When this problem occurs, the well must be redrilled or extreme measures taken to remove the fractured portion of the screen cylinder.

Screens with higher weight or geomechanical pressure have been traditionally made from heavier construction. The screen may include wire spirally wrapped and welded to a set of longitudinal rods. The tensile or weight bearing strength of the screen is then dependent at least in part on the strength of the longitudinal rods. Larger rods may be used to provide higher screen strength. While the rods themselves may be able to resist the overall loading, the load capacity of the assembly is also dependent on the bond between the screen rods and any fittings that are used to attach the screen to pipes or additional screens. These fittings are often threaded male or female ends welded to each end of the screen cylinder. With a conventional screen, the maximum weld area for welding rods to the fitting at the end of the screen may be equivalent to the cross sectional area of the longitudinal rods. Considering that the type of welds normally used to attach the screen to the fittings does not allow for full use of the available weld area, the strength of the screen for structural resistance may be limited by this joint.

SUMMARY

Embodiments disclosed herein may include a supplemental structural member or bar running parallel to the screen rods and attaching to the end fitting. These supplemental bars are attached to the longitudinal screen rods, and provide a greater attachment area resulting in a larger allowable weld area. Consequently the screen may accommodate a larger load and in some embodiments may be considered a heavy duty screen using a deep well fitting attachment.

In accordance with one embodiment disclosed herein, a screen for intake of fluid is provided. The screen includes a plurality of substantially parallel, spaced rods, filtration material, a fitting, and a plurality of structural members. The plurality of rods is distributed about a longitudinal axis, has a length, and terminates at a first end and a second end. The filtration material is disposed around a portion of the length of the plurality of rods to define an interior volume, and is configured to allow fluid to pass therethrough while preventing particulate matter greater than a predetermined size from passing therethrough. The fitting is disposed at the first end of the plurality of rods and adjacent to the filtration material, and is configured to be proximate to an end of each of the rods. Each structural member is interposed between adjacent rods and has a first end proximate to the first end of the plurality of rods and a second end spaced from the second end of the plurality of rods. The structural members are welded to the adjacent rods, and the adjacent rods and the structural members are welded to the fitting.

In some embodiments, the filtration material includes wire spirally wrapped around the plurality of rods to form slots for receiving fluid into the interior volume. In some embodiments and in combination with any of the above embodiments, each end of the plurality of rods is substantially in a plane perpendicular to the longitudinal axis. In some embodiments and in combination with any of the above embodiments, the plurality of rods is arranged in a cylindrical configuration. In some such embodiments, the fitting is a substantially cylindrical ring. In some embodiments and in combination with any of the above embodiments, the welding of the structural member to the adjacent rods and the fitting effectively increases the weld area for the connection of the rods to the fitting. In some such embodiments, the increased weld area increases the tensile strength of the connection of the rods to the fitting.

In some embodiments and in combination with any of the above embodiments, the structural members are elongated bars. In some such embodiments, the elongated bars are substantially parallel to the adjacent rods. In some such embodiments, the adjacent rods define a space therebetween, and every space receives a bar. In other such embodiments, the adjacent rods define a space therebetween, and alternating spaces receive a bar. In some such embodiments, at least the first end of each bar is welded to the fitting. In some such embodiments, the first end of each bar is substantially in the plane at the first end of the rods.

In some embodiments and in combination with any of the above embodiments, each structural member comprises a plurality of pieces. In some such embodiments, each piece is an elongated bar.

In accordance with another embodiment disclosed herein, another screen for intake of fluid is provided. The screen includes a plurality of substantially parallel, spaced rods, wire, a cylindrical end fitting, and a plurality of bars. The plurality of rods is distributed about a longitudinal axis in a cylindrical arrangement, has a length, and terminates at a first end and a second end substantially in a plane perpendicular to the longitudinal axis. The wire is spirally wrapped around the plurality of rods to define an interior volume and to form slots for receiving fluid into the interior volume. The cylindrical end fitting has a central axis and is disposed at the first end of the plurality of rods and adjacent to the wire. The central axis is aligned with the longitudinal axis of the plurality of rods. Each bar is interposed between adjacent rods and has a first end proximate to the first end of the plurality of rods and a second end spaced from the second end of the plurality of rods. The bars are welded to the adjacent rods and the adjacent rods and the bars are welded to the end fitting.

In accordance with another embodiment disclosed herein, a method of making a screen for intake of fluid is provided. A plurality of rods is disposed in a substantially parallel, spaced, cylindrical arrangement about a longitudinal axis, with the plurality of rods having a length and terminating at a first end and a second end substantially in a plane perpendicular to the longitudinal axis. Filtration material is disposed around at least a portion of the length of the plurality of rods to define an interior volume with the filtration material configured to allow fluid to pass through it while preventing particulate matter greater than a predetermined size from passing through. A cylindrical end fitting is having a central axis is disposed at the first end of the plurality of rods and adjacent to the wire. The central axis is coincident with the longitudinal axis of the plurality of rods. A plurality of bars is provided, and each bar is disposed between selected ones of adjacent rods. Each bar has a first end proximate to the first end of the plurality of rods and a second end spaced from the second end of the plurality of rods. The bars are welded to the adjacent rods, and the adjacent rods and the bars are welded to the end fitting. In some embodiments, disposing filtration material around at least a portion of length of the rods includes spirally wrapping wire around the plurality of rods to define the interior volume and to form slots for receiving fluid into the interior volume.

BRIEF DESCRIPTION OF THE DRAWINGS

For a more complete understanding, reference should now be had to the embodiments shown in the accompanying drawings and described below. In the drawings.

DETAILED DESCRIPTION

The following detailed description of embodiments refers to the accompanying drawings, which illustrate specific embodiments. Other embodiments having different structures and operation do not depart from the scope of the present disclosure.

Certain terminology is used herein for convenience only and is not to be taken as a limitation on the embodiments described. For example, words such as "top", "bottom", "upper," "lower," "left," "right," "horizontal," "vertical," "upward," and "downward" merely describe the configuration shown in the figures. Indeed, the referenced components may be oriented in any direction and the terminology, therefore, should be understood as encompassing such variations unless specified otherwise. Throughout this disclosure, where a process or method is shown or described, the method may be performed in any order or simultaneously, unless it is clear from the context that the method depends on certain actions being performed first.

Figure 1:
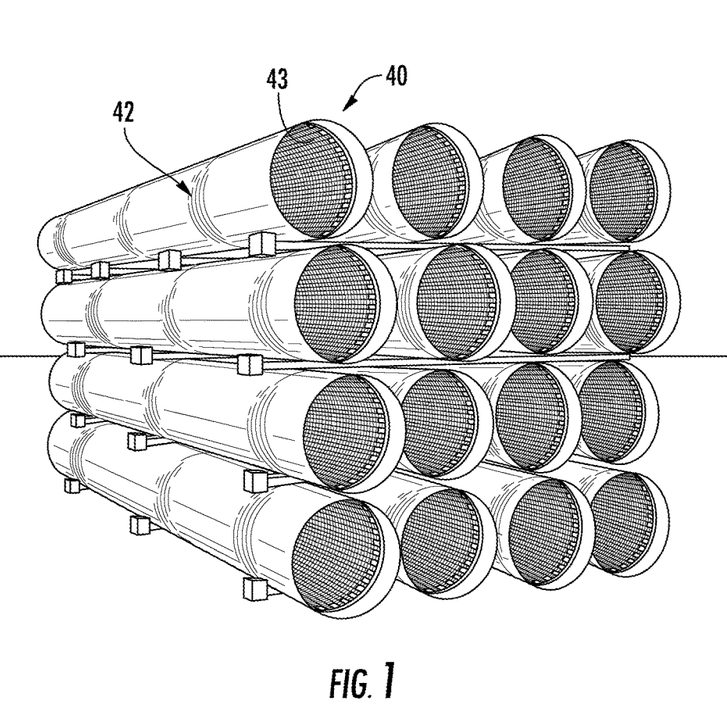
FIG. 1 is a perspective view of one or more embodiments of screens in a stacked position for storage.
Figure 2:
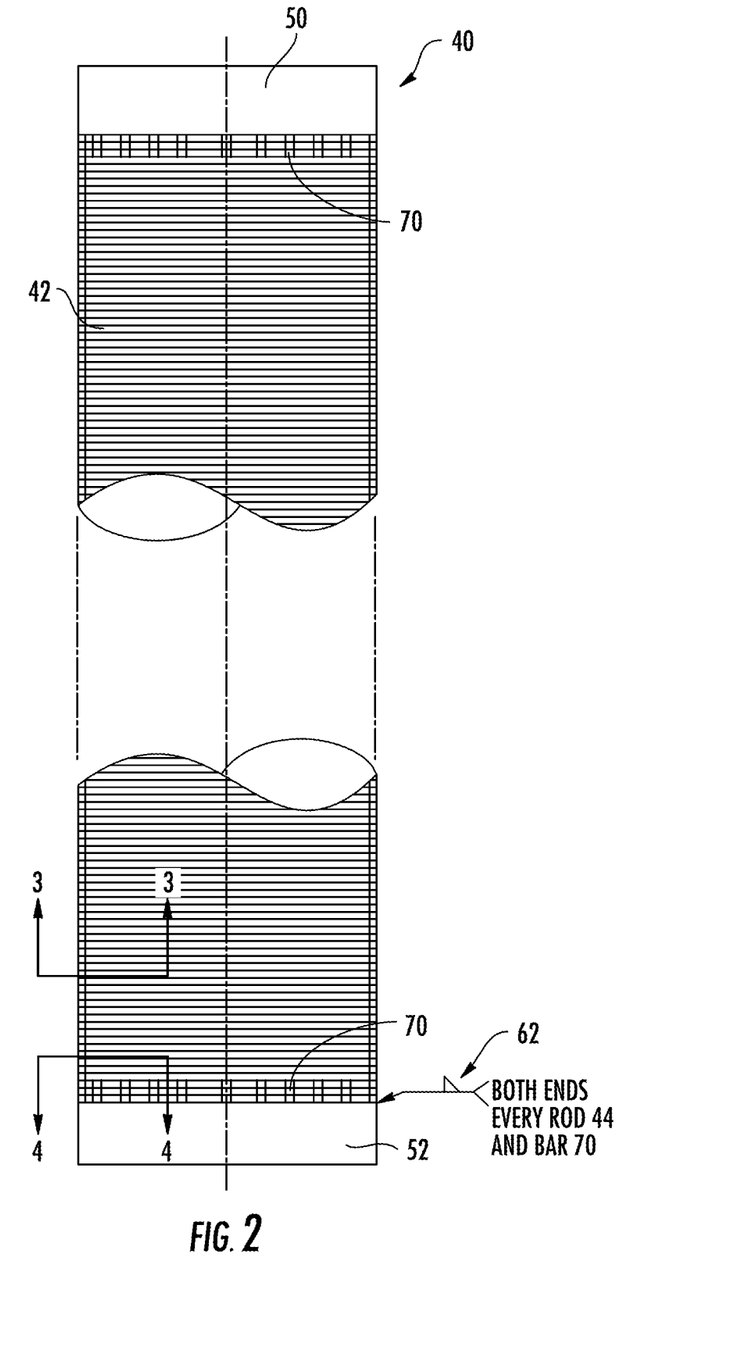
FIG. 2 is a plan view of a screen according to one embodiment.

Referring to the drawings, where like reference numerals refer to the same or similar parts, FIG. 1 shows one or more embodiments of screens 40 for a water well, stacked for storage, and FIG. 2 shows an embodiment of an individual screen 40. When installed, the screens 40 may be connected end to end in vertical alignment. Although the outside surface of the screens 40 appears smooth, the screens 40 are formed with openings and are shown with spirally wrapped wires 42 that form slots as serve as filtration material.

In one embodiment, the screens 40 may include as filtration material a plurality of spaced filter wires supported on support rods. In one embodiment, the screens may include "Vee-Wire" type screens. In one embodiment, the screens 40 may include as filtration material plates (not shown) having perforations, slots, or other filter-type openings. In one embodiment, the spacing and sizes of wires 42 vary along the lengths of the screens 40. In one embodiment, the screens 40 may include as filtration material any combination of wires 40 and plates. The screens may be fabricated based on the same principle as the embodiments disclosed in U.S. Pat. No. 6,663,774, filed on Oct. 16, 2001 and specifically with respect to the filter wires 28 and the support rods 20 described therein, and embodiments like those disclosed in U.S. Pat. No. 7,425,264, filed on Jul. 18, 2005 and specifically with respect to the wires 16 and the support rods 17 described therein, the contents of both of which patents are herein incorporated by reference in their entirety.

Figure 3:
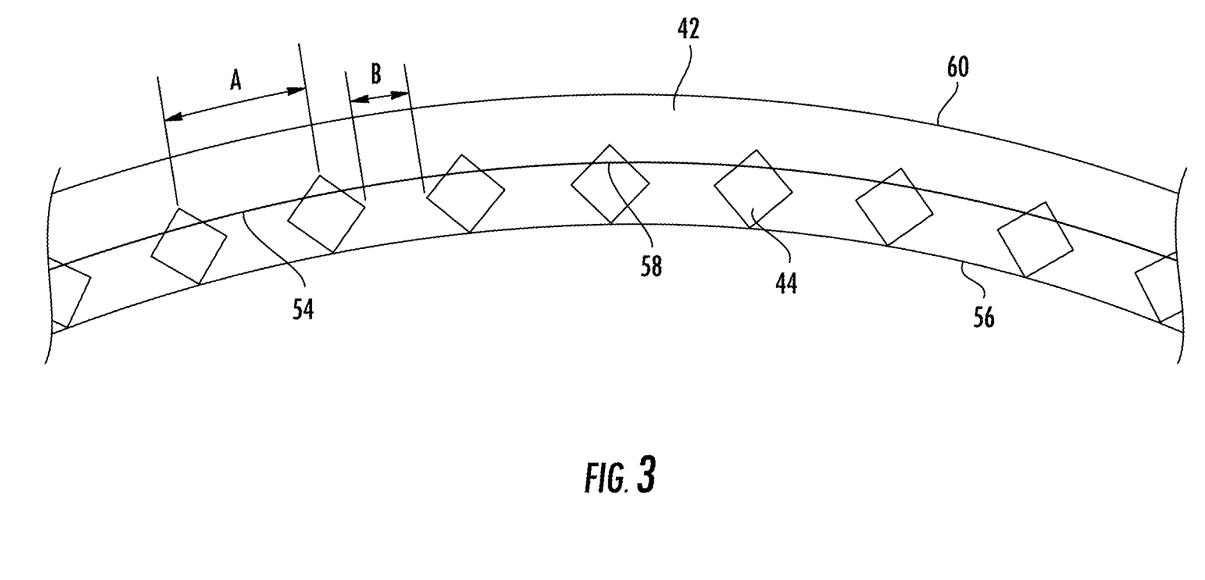
FIG. 3 is a cross-section view of a portion of the screen of FIG. 2 taken along line 3-3 of FIG. 2.

In the "Vee-Wire" type of screen, a filtering surface is formed by wires 42 with a V-shaped cross-section, meaning that they each have a generally triangular-shaped cross-section and which are parallel at constant intervals, the space between wires forming the slots of the screen. As shown in FIG. 3, these wires 42 are welded to support rods 44 oriented essentially perpendicularly with respect to the wires 42, and may be relatively thin in order to maximize the effective opening of the slots. Such a screen 40 may have the advantage of being very strong and being resistant to clogging. The screen 40 allows a liquid, for example water, to pass through it, while preventing particulate matter greater than a certain size from entering the interior of the screen 40. Each wire 42 includes a face surface and two side surfaces which converge to a point. The wires 42 are aligned, side-by-side, with their face surfaces lying in a plane, which, as will be further discussed below, creates the outer surface of the screen 40 and defines an interior volume 43.

In one method of manufacture, the screen 40 may be constructed by inserting a number of support rods 44 into a series of notches equally spaced around the circumference of a specially designed wheel (not shown). In the case of square, rectangular, or V-shaped profile rods, the notches in the wheel may be generally triangular in shape. In this way, the support rods 44 are secured around the wheel and extend substantially perpendicularly to the wheel to create a cylinder of support rods 44. The wheel, and thus the cylinder of rods 44, is then rotated and a wire 42 is continuously and spirally wrapped around the rotating cylinder of rods 44. At each point where the wire 42 intersects a rod 44, an electrical charge is conducted through the intersection and the wheel, thereby welding the wire 42 to the rod 44. The result is a screen cylinder formed with a plurality of longitudinally extending rods 44 spirally-wrapped in a wire 42. The rods 44 may be substantially parallel, spaced from each other, and distributed about a longitudinal axis, with the plurality of rods 44 having a length and terminating at a first end and a second end. Each end of the plurality of rods 44 may terminate substantially in a plane perpendicular to the longitudinal axis. The rods 44 may be arranged in, for example, a cylindrical configuration.

When using wires of V-shaped cross-section, a channel is created between opposing side surfaces of consecutive wires. Because of the triangular shaped cross-section of the wires in one embodiment, the channels between consecutive wires open away from the plane defined by the face surfaces of the filter wires. Put another way, the filter channels do not have parallel walls, but instead flare from the face surfaces to the points of the wires.

Figure 4:
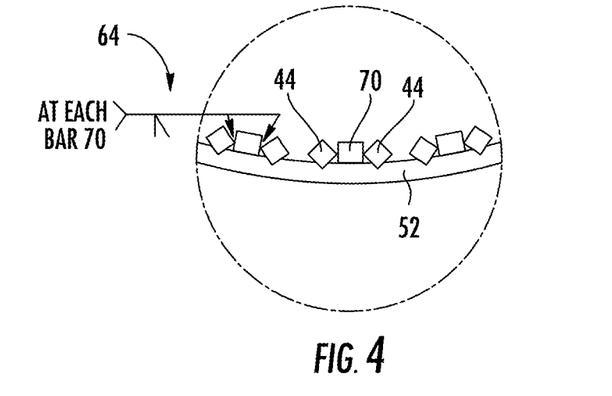
FIG. 4 is a cross-section view of a portion of the screen of FIG. 2 taken along line 4-4 of FIG. 2.
Figure 5:
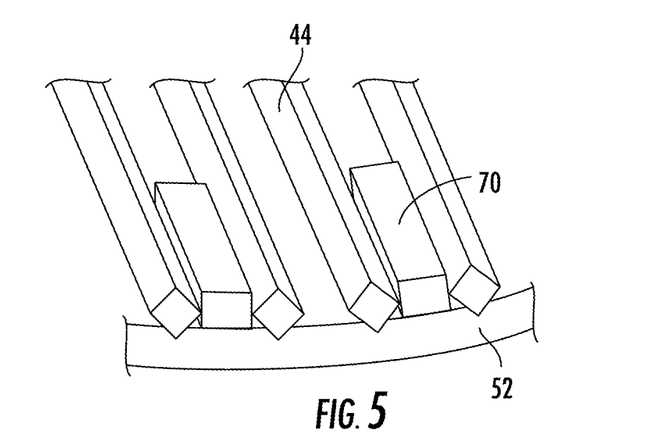
FIG. 5 is a detail perspective view of a portion of the end of the screen of FIG. 2.

FIG. 2 shows an embodiment of a screen 40 with end fittings that are weld rings 50, 52 at each end. Rods 44 are not shown in FIG. 2 for clarity, but are shown in FIGS. 3-5. In FIG. 3 the configuration of rods 44 and wires 42 may be seen. The rods 44 in this embodiment are angled such that a corner of each rod 44 contacts the wire 42, and the wire 42 is welded to each rod 44 at that point. The rods 44 maybe at a center to center distance of A, and have a spacing of B. The rings 50, 52 (not shown in FIG. 2) may have inside diameter (I.D.) 54, the saddle (also not shown), which supports the rods 44, may have a diameter 56 (which is also the screen barrel inside diameter), the wire 42 may have an inside diameter (I.D.) 58, and the screen may have an outside diameter (O.D.) 60. The gap between the wire 42 and the weld rings 50, 52 preferably does not exceed the dimension of the slot between the wires 42. The wire 42, i.e., filtration material, may be disposed around at least a portion of the length of the plurality of rods 44 to define the interior volume 43, with the wire 42 configured to allow fluid to pass through the slots while preventing particulate matter greater than a predetermined size from passing through.

As shown in FIGS. 4 and 5 in one embodiment of a screen 40, in between the rods 44 at the ends of the screen 40 are supplemental bars 70, which may also be referred to as structural members, tabs, or spacers. The bars 70 may be elongated and substantially span the distance between pairs of adjacent rods 44 and be substantially parallel to the rods 44. In the embodiment shown the bars 70 are located between every other pair of rods 44. Alternatively, the bars 70 could be in the spaces between all adjacent rods 44, or could be at less frequent intervals with the necessary spacing dependent on the application. The number of rods 44 and their spacing may also be varied.

In this embodiment the bars 70 are rectangular and are welded to the rods 44, but other shapes are feasible and may be desirable depending on the application. The bars 70 are preferably flush with the ends of the rods 44, and may be relatively short, not as long as the rods 44 and not extending the entire length of the screen 40. In the embodiments shown herein, the bars 70 are very short relative to the rods 44. The bars 70 may each have a first end proximate to the first end of the plurality of rods and a second end spaced from the second end of the plurality of rods. The rods 44 and the bars 70 are welded to each other and to the weld rings 50, 52, which in some embodiments are end fittings, or fittings. The weld rings 50, 52 may be configured to be proximate to an end of each of the rods 44. The weld rings 50, 52 may each be, for example, a substantially cylindrical ring to match the configuration of the plurality of rods 44 and having a central axis that is aligned with the longitudinal axis of the plurality of rods 44. In this manner the area of the weld is increased by the increased area provided by the end of the bar 70, which increases the strength of the weld and the load that the screen 40 can bear. With the bars 70 the tensile strength of the connection of the rods 44 to each weld ring 50, 52, and of the screen 40 overall, may increase, especially if the weakest part of the screen was previously the connection of the rods 44 and the end fittings, in this case the weld rings 50, 52.

In one embodiment, the screen is 24 inch O.D. There may be 70 rods 44 spaced evenly around the cylinder that extend the full length between the weld rings 50, 52, and the rods 44 could be, for example, ⅜ inches square in cross-section. The rods 44 could have a 1.042 inches center to center distance A, and have a spacing B of 0.519 inches. The weld rings 50, 52 could be 6 inches long with a 24 inch O.D. and, for example, 0.5 inches thick for a 23 inch I.D 54. The screen O.D. 60 could be 24 inches, and the saddle diameter 56 (or screen barrel I.D.) could be 22.189 inches. The wire I.D. 58 could be 23.024 inches. The overall length of the screen 40 could be 240 inches, with the 6 inch long weld rings 50, 52 at each end for a 228 inch long wire portion of the screen 40. The bars 70 in this embodiment are rectangular and may be, for example, ⅜ inch by ½ inch by 2 inches long.

Weld symbols are shown in the figures to disclose the embodiment of a screen 40 shown in FIGS. 2-6. However, it should be understood that different welds could be used as determined by one of ordinary skill in the art. As shown in FIG. 2, the weld rings 50, 52 may be welded to the rods 44 and bars 70 with a fillet weld 62 on the surface of the weld ring 50, 52 that is on the interior of the screen 40. Such a fillet weld 62 is called for in the embodiment shown at each end of the screen 40 for all rods 44 and all bars 70. The fillet weld 62, which may be, for example, ⅜ inch. As shown in FIG. 4, the rods 44 and the bars 70 may be welded to each other with a bevel weld 64 on each side of each bar 70. In one embodiment, at least one end of each bar 70 is welded to the weld ring 50, 52.

In addition, it may be considered that the bars 70 disclosed herein, as structural members, may be provided in more than one piece. For example, each structural member may be provided as two or more elongated bars, and as such, more than one bar may be inserted between adjacent rods 44 to make up a structural member.

Figure 6:
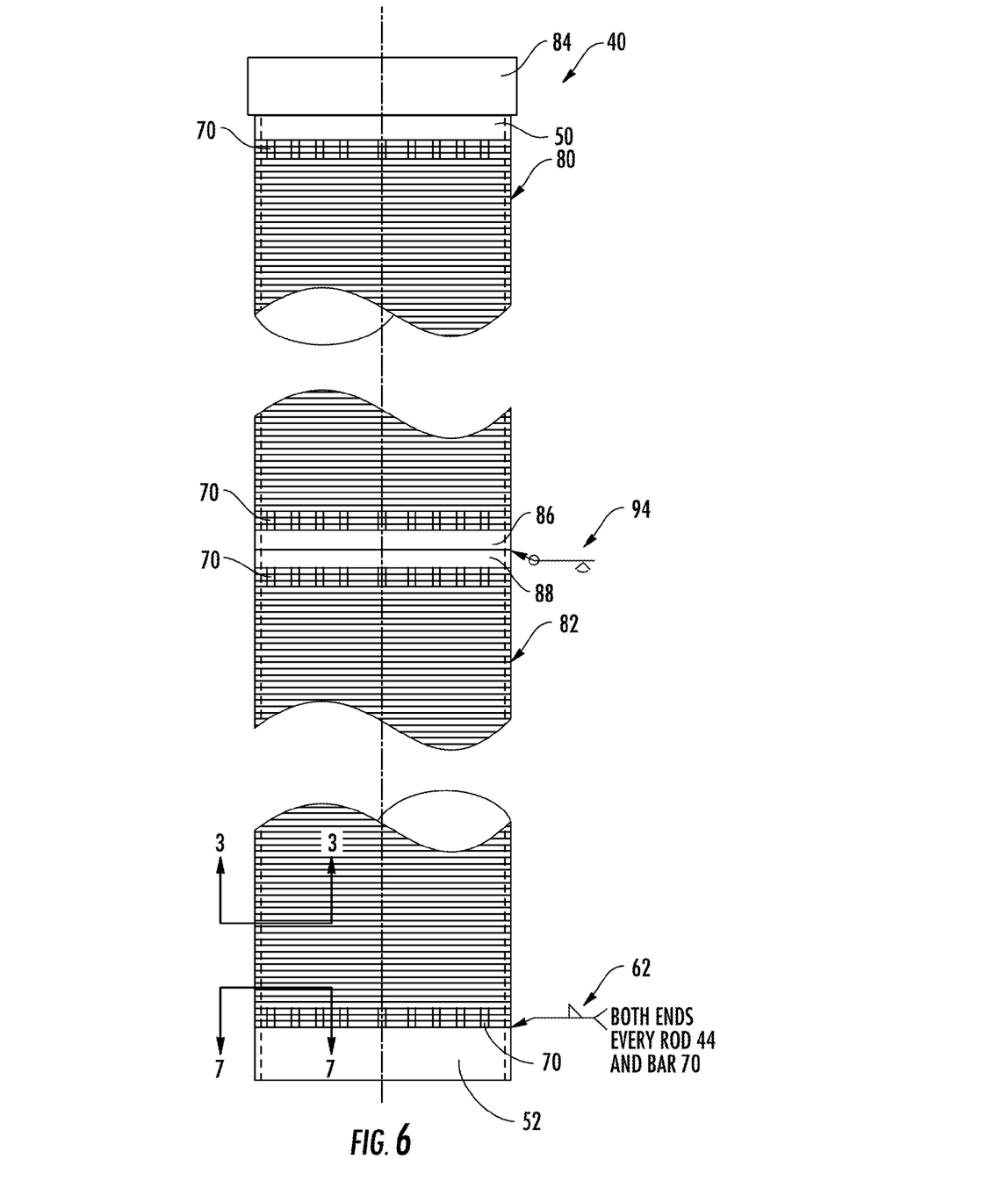
FIG. 6 is a plan view of a screen according to another embodiment.
Figure 7:
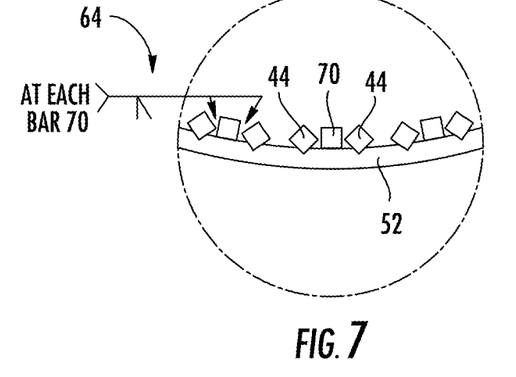
FIG. 7 is a cross-section view of a portion of the screen of FIG. 6 taken along line 7-7 of FIG. 6.
Figure 8:
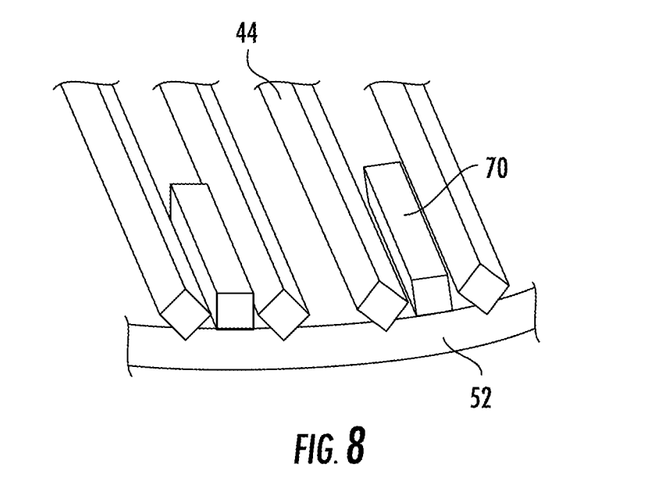
FIG. 8 is a detailed perspective view of a portion of the end of the screen of FIG. 6.

FIG. 6 shows another embodiment of a screen 40 that is made up of two shorter screens 80, 82. The first shorter screen 80 has a fitting at one end that is a collar 84 attached to a weld ring 50 and a fitting at the other end that is a weld ring 86. The second shorter screen 82 has a fitting at one end that is a weld ring 88 and a fitting at the other end that is a longer weld ring 52. The central weld rings 86, 88 are welded to each other to form the full length screen 40. The collar 84 may be welded, for example, to a weld ring on an adjacent screen or pipe, or in another embodiment could be female threaded to receive a male threaded fitting. The weld ring 52 may be welded, for example, to a weld ring on another adjacent screen. Rods 44 are not shown in FIG. 6 for clarity, but are shown in FIGS. 7 and 8. The configuration of rods 44, wires 42, and weld rings 50, 52, 86, 88 are the same as that shown in FIG. 3.

As shown in FIGS. 7 and 8, similarly to FIGS. 4 and 5, in between rods 44 at the ends of the screens 80, 82 are supplemental bars 70. The bars 70 may substantially span the distance between pairs of adjacent rods 44, and in the embodiment shown are again located between every other rod 44. As previously discussed, the bars 70 could be between every rod 44, or could be at less frequent intervals with the necessary spacing dependent on the application. In this embodiment, the bars 70 are square and are welded to the rods 44, but other shapes are feasible and may be desirable depending on the application; for example, the rectangular and square bars 70 shown herein may also be considered to represent round, elliptical, triangular, or asymmetrical cross-sectional shapes. In addition, the rotational orientation of the bars 70 may differ from that shown. Once again, in this embodiment the bars 70 are preferably flush with the ends of the rods 44, and may be relatively short, not as long as the rods 44 and not extending the entire length of the screen 40. The rods 44 and the bars 70 are welded to the weld rings 50, 52, 86, 88. In this manner the area of the weld is increased by the increased area provided by the end of the bar 70, which increases the strength of the weld and the load that the screen 40 can bear.

In the embodiment of the screen 40 of FIGS. 6-8, the dimensions may be the same as in the embodiment of FIGS. 2-5, with the following additions. The weld rings 50, 52 at the ends of the screen 40 could be 6 inches long with a 24 inch O.D. and, for example, 0.5 inches thick for a 23 inch I.D 54. The central weld rings 86, 88 could be similar but each 2 inches long. The wired portion of the screens 80, 82 could each be 232 inches, with the overall length of the screen 40 being 483 inches. The bars 70 in this embodiment are square and may be, for example, ⅜ inch by ⅜ inch by 2 inches long.

Additional welds that may be applicable to the embodiment of a screen 40 shown in FIGS. 6-8 include a V weld 94 all around where the central weld rings 86, 88 are joined, which may be finished to a smooth convex contour by grinding. The weld dimension in one embodiment may be 0.19 inches. Again, it should be understood that different welds could be used as determined by one of ordinary skill in the art. The weld rings 50, 52, 86, 88 may be welded to the rods 44 and bars 70 with a fillet weld 62, on the surface of the weld ring 50, 52, 86, 88 that is on the interior of the screen 40. Accordingly, such a fillet weld 62 is called for in the embodiment shown at one end of each of the shorter screens 80, 82 for all rods 44 and all bars 70. The fillet weld 62 may be, for example, ⅜ inch. The rods 44 and the bars 70 may be welded to each other with a bevel weld 64 on each side of each bar 70.

Figure 9:
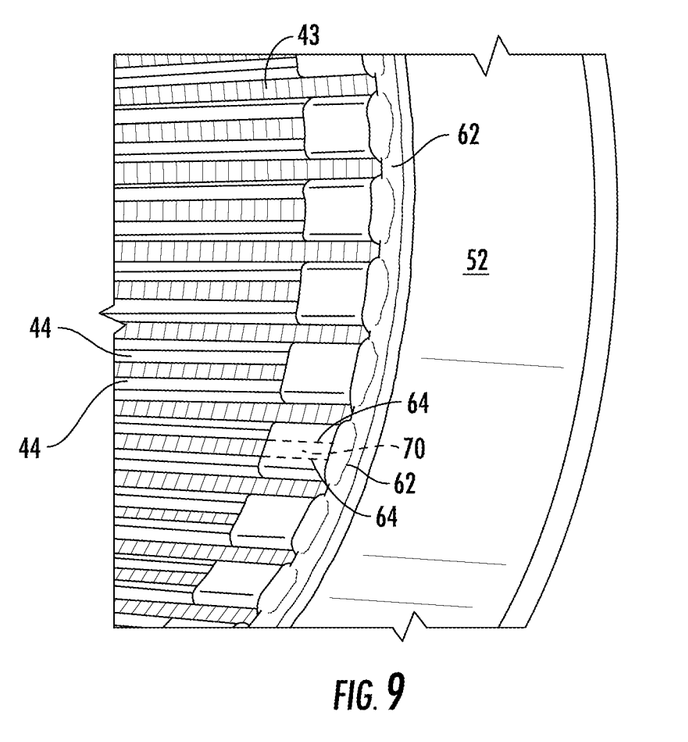
FIG. 9 is a detailed perspective view of a portion of the ends the screens of FIGS. 2 and 6.

FIG. 9 shows the interior of an embodiment of a screen 40 at one end. Rods 44 extend to the weld ring 52 where there is a weld 62 to connect the rods to the weld ring. The weld 62 also connects the bar 70 to the weld ring 52, and a weld 64 connects the bar 70 and the rods 44 together.

Materials for the screens may be selected by one of ordinary skill in the art as appropriate for the particular application, but one material that may be used is AISI 316 stainless steel. For 316 Stainless Steel, design features, characteristics, and strengths in one embodiment of screens in accordance with the previously described embodiments for a well are as follows:

| Feature | English Units | Metric Units |
| --- | --- | --- |
| Nominal Size | 24 in | 610 mm |
| Estimated Total Well Depth | 1,500 ft | 457 meters |
| Estimated Feet of Screen | 850 ft | 259 meters |
| Design Slot Size | 0.070 in | 1.8 mm |
| Approx. O.D. | 23.94 in | 608 mm |
| Screen Barrel I.D. | 22.19 in | 564 mm |
| Approx. Clear I.D. at Fittings | 21.69 in | 551 mm |
| Approx. Weight Per Foot | 100 lbs | 46 kg |
| Wire Width | 0.248 in | 6.3 mm |
| Wire Height | 0.488 in | 12.4 mm |
| Calculated Collapse Strength | 2323 PSI | 16 kg/sq. cm |
| Open Area | 22.0% | 22.0% |
| Intake Area | 199 sq. in/ft | 4,206 sq. cm/meter |
| Transmitting Capacity - at 0.1 feet/second | 62 gpm/ft | 13.5 lps/meter |
| Support Rod Diameter (circle through all corners of rod) | 0.530 in | 13.5 mm |
| Number of Rods | 70 | 70 |
| Cross-Sectional Rod Area (total) | 9.84 in | 63.51 sq. cm |
| Design Yield Strength | 30,000 PSI | 2,109 kg/sq. cm |
| Calculated Tensile Strength | 206,700 lbs | 93,800 kg |
| Maximum Recommended Hang Weight | 103,400 lbs | 46,900 kg |
| Column Load | 265,000 lbs | 120,500 kg |

Embodiments disclosed herein may provide relatively more open area for intake of fluid than conventional screens, with added overall strength for applications in dewatering and water supply, and may be of particular benefit for water wells in the mining industry.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein. While the foregoing is directed to embodiments of a screen and components used in water wells, other and further embodiments may be devised without departing from the basic scope thereof, and the scope thereof is determined by the claims that follow.

What is claimed is:

1. A screen for intake of fluid, comprising:
a plurality of substantially parallel, spaced rods distributed about a longitudinal axis, the plurality of rods having a length and terminating at a first end and a second end;
filtration material disposed around a portion of the length of the plurality of rods to define an interior volume, the filtration material configured to allow fluid to pass therethrough while preventing particulate matter greater than a predetermined size from passing therethrough;
a fitting at the first end of the plurality of rods and adjacent to the filtration material, the fitting configured to be proximate to an end of each of the rods;
a plurality of structural members, each structural member interposed between adjacent rods and having a first end proximate to the first end of the plurality of rods and a second end spaced from the second end of the plurality of rods, wherein the structural members are welded to the adjacent rods, and the adjacent rods and the structural members are welded to the fitting.

2. The screen of claim 1, wherein the filtration material comprises wire spirally wrapped around the plurality of rods to form slots for receiving fluid into the interior volume.

3. The screen of claim 1, wherein each end of the plurality of rods is substantially in a plane perpendicular to the longitudinal axis.

4. The screen of claim 3, wherein the plurality of rods is arranged in a cylindrical configuration.

5. The screen of claim 4, wherein the fitting is a substantially cylindrical ring.

6. The screen of claim 1, wherein the welding of the structural member to the adjacent rods and the fitting effectively increases the weld area for the connection of the rods to the fitting.

7. The screen of claim 6, wherein the increased weld area increases the tensile strength of the connection of the rods to the fitting.

8. The screen of claim 1, wherein the structural members are elongated bars.

9. The screen of claim 8, wherein the elongated bars are substantially parallel to the adjacent rods.

10. The screen of claim 8, wherein the adjacent rods define a space therebetween, and every space receives a bar.

11. The screen of claim 8, wherein the adjacent rods define a space therebetween, and alternating spaces receive a bar.

12. The screen of claim 8, wherein at least the first end of each bar is welded to the fitting.

13. The screen of claim 12, wherein the first end of each bar is substantially in the plane at the first end of the rods.

14. The screen of claim 1, wherein each structural member comprises a plurality of pieces.

15. The screen of claim 14, wherein each piece is an elongated bar.

16. A screen for intake of fluid, comprising:
    a plurality of substantially parallel, spaced rods distributed about a longitudinal axis in a cylindrical arrangement, the plurality of rods having a length and terminating at a first end and a second end substantially in a plane perpendicular to the longitudinal axis;
    wire spirally wrapped around the plurality of rods to define an interior volume and to form slots for receiving fluid into the interior volume;
    a cylindrical end fitting having a central axis and disposed at the first end of the plurality of rods and adjacent to the wire, the central axis aligned with the longitudinal axis of the plurality of rods;
    a plurality of bars, each bar interposed between adjacent rods and having a first end proximate to the first end of the plurality of rods and a second end spaced from the second end of the plurality of rods, wherein the bars are welded to the adjacent rods, and the adjacent rods and the bars are welded to the end fitting.

17. A method of making a screen for a water intake, comprising:
    disposing a plurality of rods in a substantially parallel, spaced, cylindrical arrangement about a longitudinal axis, the plurality of rods having a length and terminating at a first end and a second end substantially in a plane perpendicular to the longitudinal axis;
    disposing filtration material around at least a portion of the length of the plurality of rods to define an interior volume, the filtration material configured to allow fluid to pass therethrough while preventing particulate matter greater than a predetermined size from passing therethrough;
    disposing a cylindrical end fitting having a central axis at the first end of the plurality of rods and adjacent to the wire, the central axis coincident with the longitudinal axis of the plurality of rods;
    providing a plurality of bars and disposing each bar between selected ones of adjacent rods, each bar having a first end proximate to the first end of the plurality of rods and a second end spaced from the second end of the plurality of rods;
    welding the bars to the adjacent rods; and
    welding the adjacent rods and the bars are to the end fitting.

18. The method of claim 17, wherein disposing filtration material around at least a portion of the length of the plurality of rods comprises spirally wrapping wire around the plurality of rods to define an interior volume and to form slots for receiving fluid into the interior volume.

* * * * *

UNITED STATES PATENT AND TRADEMARK OFFICE
CERTIFICATE OF CORRECTION

PATENT NO. : 9,604,164 B2  
APPLICATION NO. : 14/331915  
DATED : March 28, 2017  
INVENTOR(S) : Smith et al.

Page 1 of 1

It is certified that error appears in the above-identified patent and that said Letters Patent is hereby corrected as shown below:

In the Specification

Column 2, Line 67:
After "fitting" delete "is".

Column 4, Line 2:
After "slots" delete "as" and insert -- and --.

Column 5, Line 10:
After "maybe" delete "as" and insert -- may be --.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*